(12) United States Patent
Merkel et al.

(10) Patent No.: US 10,305,965 B2
(45) Date of Patent: May 28, 2019

(54) PROVISION OF APPLICATIONS ON MULTIPLE ELECTRONIC DEVICES

(71) Applicant: Institut für Rundfunktechnik GmbH, München (DE)

(72) Inventors: Klaus Merkel, München (DE); Michael Probst, München (DE)

(73) Assignee: INSTITUT FUR RUNDFUNKTECHNIK GMBH, Munich (DE)

(*) Notice: Subject to any disclaimer, the term of this patent is extended or adjusted under 35 U.S.C. 154(b) by 135 days.

(21) Appl. No.: 14/424,910

(22) PCT Filed: Aug. 28, 2013

(86) PCT No.: PCT/EP2013/067841
§ 371 (c)(1),
(2) Date: Feb. 27, 2015

(87) PCT Pub. No.: WO2014/033182
PCT Pub. Date: Mar. 6, 2014

(65) Prior Publication Data
US 2015/0229703 A1    Aug. 13, 2015

(30) Foreign Application Priority Data
Aug. 29, 2012 (IT) .............................. TO2012A0744

(51) Int. Cl.
*G06F 9/54* (2006.01)
*G06F 9/451* (2018.01)
(Continued)

(52) U.S. Cl.
CPC .............. *H04L 67/10* (2013.01); *G06F 9/452* (2018.02); *G06F 9/546* (2013.01); *H04L 67/42* (2013.01)

(58) Field of Classification Search
CPC ....... H04L 67/10; H04L 67/42; G06F 9/4445; G06F 9/546
(Continued)

(56) References Cited

U.S. PATENT DOCUMENTS

| 2010/0211976 A1 | 8/2010 | Chiu et al. |
| 2010/0268828 A1 | 10/2010 | Pahlavan |

(Continued)

FOREIGN PATENT DOCUMENTS

| JP | 2005333272 A | * 12/2005 |
| JP | 2006099150 A | * 4/2006 |

(Continued)

OTHER PUBLICATIONS

Wikipedia, Dynamic Host Configuration Protocol, Dec. 27, 2016, en.wikipedia.org (18 pages).*

(Continued)

*Primary Examiner* — Wing F Chan
*Assistant Examiner* — Leon Y Tseng
(74) *Attorney, Agent, or Firm* — Workman Nydegger (57) ABSTRACT

Method for executing applications on electronic devices, wherein a first application (11) on a first electronic device (21) controls the execution of a second application (12) on a second electronic device (22), and a first server (31) provides an environment for executing the second application (12), wherein the method includes the steps of: executing the first application (11) on the first electronic device (21); initiating the execution of the second application (12) by the first electronic device; coupling of the first electronic device (21) to the second electronic device (22); providing the environment for executing the second application (22) by the first server (31); and executing the second application (12) on the second electronic device (22).

4 Claims, 3 Drawing Sheets

(51) Int. Cl.
*H04L 29/06* (2006.01)
*H04L 29/08* (2006.01)

(58) Field of Classification Search
USPC ........................................................ 709/203
See application file for complete search history.

(56) References Cited

U.S. PATENT DOCUMENTS

| | | |
|---|---|---|
| 2010/0274762 A1 | 10/2010 | Murphy et al. |
| 2011/0105226 A1 | 5/2011 | Perlman |
| 2012/0240142 A1* | 9/2012 | Rose ................. H04H 20/38 725/14 |
| 2012/0331139 A1* | 12/2012 | Yamada ............ H04L 12/2816 709/224 |
| 2013/0191757 A1* | 7/2013 | Smith ................ G06F 3/0488 715/748 |
| 2014/0052770 A1* | 2/2014 | Gran ............... H04N 21/26258 709/203 |
| 2014/0101546 A1* | 4/2014 | Taoka ................ G06F 3/0481 715/708 |

FOREIGN PATENT DOCUMENTS

| | | |
|---|---|---|
| TW | 200845671 A | 11/2008 |
| TW | 201032073 A1 | 9/2010 |
| TW | 201039146 A1 | 11/2010 |
| WO | 2012/052341 A1 | 4/2012 |

OTHER PUBLICATIONS

Google, Google TV Remote (App for iPhone, available on iTunes since Mar. 16, 2011), screenshot (2 pages).*
Wikipedia, Web Application, Jan. 6, 2017, en.wikipedia.org (6 pages).*
PCT/EP2013/067841 International Search Report & Written Opinion dated Sep. 20, 2013.
International Preliminary Report on Patentability dated Mar. 3, 2015, issued in PCT Application No. PCT/EP2013/067841, filed Aug. 28, 2013.

* cited by examiner

Fig. 3 ial content
PROVISION OF APPLICATIONS ON MULTIPLE ELECTRONIC DEVICES

BACKGROUND OF THE INVENTION

The invention relates to methods and applications for execution and provision of applications on multiple electronic devices, in particular, on HbbTVs, Smart-TVs, Tablet PCs, Notebook PCs, Ultrabooks, Smartphones, and the like. Further, the invention relates to methods and apparatuses for execution and provision applications for radios, in particular digital radios.

It is known that services, support, and commercial content are provided via the internet. The opportunities of the internet are used by today's broadcasting organizations to provide further information, sources, offers, services, and the like. Provision is performed, in particular, in connection with the broadcasting programme or for other businesses for the pursuit of commercial goals. For this purpose, the broadcast stations refer to services, support, and commercial content using advertisement, overlays at different positions, crawlers, inserts, text inserts, graphic inserts, metadata, URLs, video text also known as teletext, and the like. These are typically accessible via internet, more precisely, via provided servers, so that users may access them. Here offers are processed, gathered, and offered under categories, such as news, sports, stock exchange, advice, science, culture, children, and the like. In addition, what is referred to as media centres are made available, which provide text content, audio content, video content, and audio-video content. The aforementioned forms of information provision are further used to refer to commercial products, which then are bought or consumed and made use of by the respective user.

Here, it is disadvantageous that two "worlds", that is, display and offer categories, are created, wherein the first display and offer category is transmitted to the receiving devices (HbbTVs, Smart-TVs, television, etc) and displayed using radio broadcast, cable connection, and the like, and the second display and offer category is retrievable via the internet. Hence the user is confronted with a division between the two display and offer categories and is forced to implement an access to the second display and offer category on a further or additional device, namely, by means of manually querying, in order to make use thereof. Here, further disadvantageous is a manual input of a source address for an access to the second display and offer category because this requires a sufficiently exact input of the user so that the user has to memorize the source address particularly well in order to make use of the second display and offer category or an offered service or to buy products, such as movies, music, books, eBooks, clothing, and the like at all.

Another disadvantage is the presence of an already pre-installed software as access requirement for use of a display and offer category. In this connection, further disadvantages result if a particular display and offer category requires the previous installation of one or multiple pieces of software so that necessarily multiple programs must be installed on the respective devices in order to use the different display and offer categories.

An additional disadvantage is a provision of a specific display and offer category via a specific provider so that the user has to carry out a registration process for creating an account at any one time in order to be able to obtain display and offer categories of different providers therewith. Consequentially, the user is forced to maintain multiple user accounts.

It is also known to synchronize multiple electronic devices, in particular computers, PCs, tablet PCs, smart phones, and the like, via a common account in order to synchronize the data between the aforementioned devices and to maintain the data with the same content on each of these devices for the user.

Here, disadvantageous is the device dependency, which typically partly results from the presence of particular hardware components and/or a particular operating system. Realizing such a synchronisation is characterized by merely storing identical data multiple times on multiple devices, which requires resources in the form of memory capacity, connection fees, and time and hence is uneconomical. In addition, it is disadvantageous when on each device a synchronisation tool must be provided locally so that no synchronisation can be performed without the synchronisation tool.

It was the object to provide applications on multiple electronic devices and to reduce at least one of the aforementioned disadvantages thereby. In particular, a solution is to be proposed for an improved, in particular, more efficient, interaction of a user between multiple electronic devices and for an improved use. Moreover, an expansion or extension of multi media contents, services, and offers is to be made usable on multiple electronic devices. At least one alternative solution is to be found.

As a solution, a method according to claim 1 is proposed, which is used for executing applications on electronic devices. The method according to the invention for executing applications on electronic devices is characterized in that a first application on a first electronic device controls the execution of a second application on a second electronic device, and a first server provides an environment for executing the second application, wherein the method comprises steps for executing the first application on the first electronic device, initiating the execution of the second application by the first electronic device, coupling of the first electronic device to the second electronic device, providing the environment for executing the second application by the first server, and executing the second application on the second electronic device. Electronic devices are to be understood as devices that are suitable for displaying text, image, audio, video, or audio-video data. These include, in particular, television devices, HbbTVs, Smart-TVs, Tablet PCs, Notebooks, PCs, Ultrabooks, Smartphones, and the like. An application is to be construed as content that can be displayed on electronic devices, wherein the term application comprises both passive, to-be-consumed presentations, such as a television programme (movies, text, picture, show, news, advertisement, music videos, music, TV shows, concerts, and the like), and presentations that allow a user interaction, such as visiting web pages or pursuing information blended-in during a programme via, for example, video text or services that are provided to the user on the electronic device, for example, by means of a set top box, a cable connection or the internet. As a result, an application can be both a simple movie or a TV show and an environment for buying products, such as movies, music, books, or clothing, and can therefore comprise all known programs, applications, services, or offers in the internet. The term "executing" is to be understood as starting, commencing, displaying, up-lighting, initiating, activating, effectuating, controlling, or any way of manipulating. The execution is to be performed in both an automatic and a manual way so that a user may adjust the way of execution. The term "environment" is to be understood as additionally covering software elements, that is, programs that allow the execution of the applications on the electronic device. The initialization of the execution means both a preliminary and a current action that either leads to the execution of an application or is the actual execution of the application. The term "coupling" is an assignment and/or allotment of at least two electronic devices for an indirect or direct communication or exchange of data. By means thereof, the execution of applications using another electronic device is made possible.

Another aspect of the invention is directed at a method for the subsequent change of the first application and/or the second application to a further application without renewed coupling. A subsequent change is to be understood as a change or a switch to another application during an already executed and running application or following the start of a previous application. Here, no coupling of the electronic devices is required so that, following a first time coupling of the electronic devices, different applications can be terminated and started or it can be switched back and forth between different applications.

According to another advantageous aspect of the invention the execution of the second application on the second electronic device is performed manually or automatically. The automatic execution is performed, for example, in such a way that the second application is automatically executed on the second electronic device as soon as the first electronic device has triggered the initialization of the execution. Here, no further interaction of a user is required. The manual execution of the second application on the second device is made possible by an intervention of the user. This involves a start of a specific program or performance of an identification process, wherein the identification process relates to both electronic devices used and user accounts.

Another aspect of the invention is directed at a method, which comprises at least a step for identification of user or the electronic devices, wherein the coupling, provision and/or identification is performed via the first server or via multiple servers in order to allow an improved capacity scaling.

According to another advantageous aspect of the invention, the first electronic device and the second electronic device exchange messages that are used and/or stored for controlling the first application on the first electronic device and/or the second application on the second electronic device. Here, exchanged messages are used for communication between the devices and/or the user of the respective devices. This yields various possibilities for controlling an application on the electronic device via an application on another electronic device. In this context, if needed, individual applications, that is, the corresponding devices by means thereof, act as control instance for other applications on other devices in the manner of a remote control. It is to be noted that controlling a device is to be understood as the controlling or manipulating an application by means of an application on another device so that a direct hardware communication between the devices is not meant. Hereby, a hardware-independent communication and simultaneously a cross-platform communication and interaction advantageously results by means of provided applications. Here, when using a television as the first electronic device and a tablet PC as the second electronic device, remote-controlling the television by means of the tablet PC is performed using commands, such as "Play", "Pause", "FFW", "REW", "REW", "REC", "STOP", and/or "EJECT". Further commands are given by the usual functions located on a remote control. Moreover, by storing messages or data on the respective devices, storing of a status is performed so that, after pausing, cancelling, terminating, inaccessibility, or the like, a resumption of the application execution and/or the restoration of the original states, before the occurrence of any of the aforementioned temporary states, is performed based on the stored messages and data.

Another aspect of the invention is directed to a method, in which the first server is responsible for the coupling between the first electronic device and the second electronic device, a second server is responsible for the communication between the first electronic device and the second electronic device, and the first electronic device communicates with the first server via a first administration unit, and the second electronic device communicates with the first server via a second administration device, and a respective client component on the first electronic device and on the second electronic device directs the message queries to the second server.

Another aspect of the invention is directed to a method for executing applications on electronic devices, characterized in that a first application on a first device, by means of a first administration unit, communicates with a second application on a second electronic device, by means of a second administration unit, via a first server, wherein the first application, by means of a first client component, communicates with the second application, by means of a second client component, via a second server, wherein an authorization for a communication session between the first electronic device, the second electronic device, the first server, and the second server is performed via at least one identification step, wherein a coupling between the first electronic device and the second electronic device and an initialization for executing the second application is performed by the first device.

According to another advantageous aspect of the invention, the initialization of the execution and/or the coupling via the internet is performed via the internet by means of a URL or QR code.

Further advantageously, a connection between the applications and/or between the devices via an internet network, a GSM network, a WLAN network, a Bluetooth network, an infrared network, a near field chip technology is established.

Another aspect of the invention is directed a method, in which the method is operated using a plurality of further second electronic devices.

Another aspect of the invention is directed at a method, in which the second device is operated as the first device.

Another aspect of the invention is directed at a method, in which the first electronic device and/or the second electronic device is a Hybrid TV (Hybrid broadcast broadband TV, Hbb-TV), Set-Top-Box, Smart-TV, Net-TV, a Tablet-PC, Smart-Phone, PC, or Notebook.

Another aspect of the invention is directed at a method, in which a provision of applications is adapted to different types of the first electronic device and the second electronic device.

Another aspect of the invention is directed at an apparatus for providing an environment for executing an application according to the method described herein.

According to another advantageous aspect, the present invention is used for providing additional contents in digital radios. A digital radio is to be regarded as a radio receiver device, which receives and processes at least partially digitalized transmission signals. Digital radio applications contain more and more visual and interactive components, such as images, categorized images, that is, slides (CAB Categorised Slideshow), hierarchical and/or categorized text or text messages (Journaline which resembles a teletext for radios) and web pages (BWS Broadcast website). The present invention allows the provision of additional contents on a second device according to the aspects according to the invention, in particular in combination with an application layer (application level API) based on JavaScript/HTML.

The present invention allows, in an advantageous way, use scenarios for radio applications at home and/or in vehicles.

According to an advantageous aspect of the invention, a car radio, in particular a digital radio, receives signals of an interactive application, wherein the application, similar to the HbbTV-Applications, has an access to EPG (electronic Program Guide) and non linear content of the radio station. Here it is especially to be noted that the driver is not distracted. Secure vehicle-driving is guaranteed in that a passenger connects his electronic device as second device (tablet and/or smartphone) with the radio application so that, following the application connection, the passenger obtains an access to the non linear content of the radio receiver.

According to an advantageous aspect of the invention, the passenger obtains detailed traffic information from the radio station on the second device so that even in an advantageous way forwarding of received traffic information to the navigation system in the vehicle can be performed in order to optimize the further route and to avoid a traffic jam.

In addition, the present invention allows the provision of applications and/or the use of content provided on-demand for further passengers in the vehicle, such as children, so that, for example, use of the content provided by the radio station is allowed, which is independent of the parents.

Further advantageously, the present invention may be applied for use scenarios at home when, in a household, multiple residents or family members together follow a radio programme, such as, for example, the music charts or a radio play, the each of the listeners may follow an individual content via a respective second device in order to obtain further background information regarding the current programme (for example, podcast).

Here, for example, a listener may switch the radio station and schedule the content of a later recorded or even the play of the found podcast for after the ending of the currently running radio programme.

The aforementioned applications according to the invention are performed without interrupting the listening activities of the other family members.

Another scenario according to the invention is the reception of lyrical contents, such as song texts on the second device for singing along, similar to karaoke as a recreational game, or for reading along a translation of a song text.

According to another advantageous embodiment of the present invention, the first device, in particular an HbbTV or a digital radio, loads a JavaScript library from a first server as framework server in order to be able to access the provided functionalities of the first server. Moreover, the aforementioned library provides a slim JS-API in an advantageous manner, which provides the most important functionalities for performing a second device scenario.

The first device, in particular an HbbTV or a digital radio, initiates, for finding a second device, a query to the JS-API. Subsequently, the first device provides information on the first device comprising a corresponding instruction for the user in order to be able to establish a connection to the second device. The aforementioned information may be provided, in particular in the form of a QR code. The user follows the instruction, in particular by means of scanning the QR code using his second device (tablet PC, smart phone). The information, in particular the QR code, contains, in particular a URL and a specific ID (unique ID), which refers to the first device. Subsequently, the URL is loaded on the second device. The URL points to a component of the environment and/or the framework, referred to as PD-Launcher, for example, "ARD.connect". The PD-Launcher directs a query to the environment and/or framework, while an ID of the first device is attached so that the environment assigns the second device to the first device. Further, the second device advantageously obtains a specific ID. In particular, the IDs are stored in a permanent cookie on both devices and as a pair of IDs in the framework. For automatically launching the application, the first device invokes the JS-API launching the application on the second device. The PD-Launcher component of the connected second device obtains and opens the corresponding URL. The application of the second device loads the JS-library so that both devices are ready for communication. Advantageously, the connection is permanently maintained and can be used by each application that uses the same instance of the framework. For this purpose, the first device loads an application of another service. The application of the first device invokes the JS-API for launching its corresponding application on the second device. The PD-Launcher component of the connected second device obtains and opens the corresponding URL. Subsequently, the application of the second device loads the JS-Library. Both devices are immediately ready to communicate with each other.

The invention will be described in more detail in the following.

Figure 1:
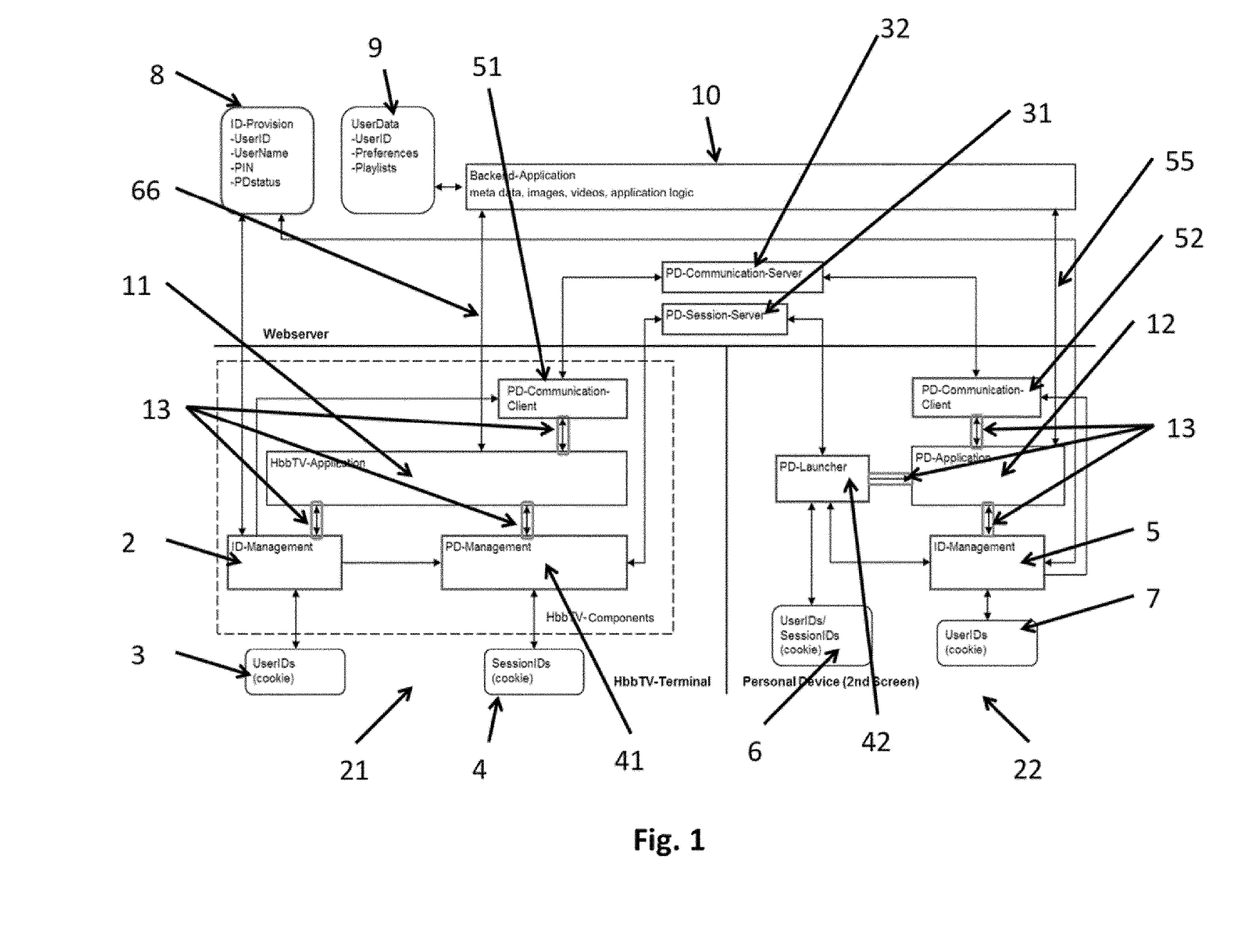
FIG. 1 schematically shows an arrangement of electronic devices.

In the following, a basic block diagram of the method according to the invention is shown by means of FIG. 1. In FIG. 1, it is shown a first electronic device (21) as HbbTV, a second electronic device (22) as personal device and/or second screen, a PD-Session-Server (31), and a PD-Communication-Server (32). Moreover, in the section of the first electronic device (21), the second electronic device (22), and the PD-Session-Server (31), there are further software based or data based components. In the section of the first electronic device and thus in the section of the HbbTV (21), there is a client component as a PD-Communication-Client (51), a first application as HbbTV-Application (11), an ID-Management (2), a first administration unit as PD-Management (41), UserIDs (3), and SessionIDs (4). In the section of the second electronic device and thus in the section of the personal device (second screen) (22) there is a further client component as PD-Communication-Client (52), a second application as PD-Application (12), a second administration unit as PD-Launcher (42), an ID-Management (5), UserIDs/SessionIDs (6), and UserIDs (7). In the section of the first server (31), there is an ID-Provision (8), a UserData (9), and a backend application. In addition, there are suitable interface components (13) for communication and for data exchange between the aforementioned components. As to the functionality of the listed components and the interaction between the individual components, reference is made to the basic and specific descriptions included in this application, and, in particular, to the following definitions.

Figure 2:
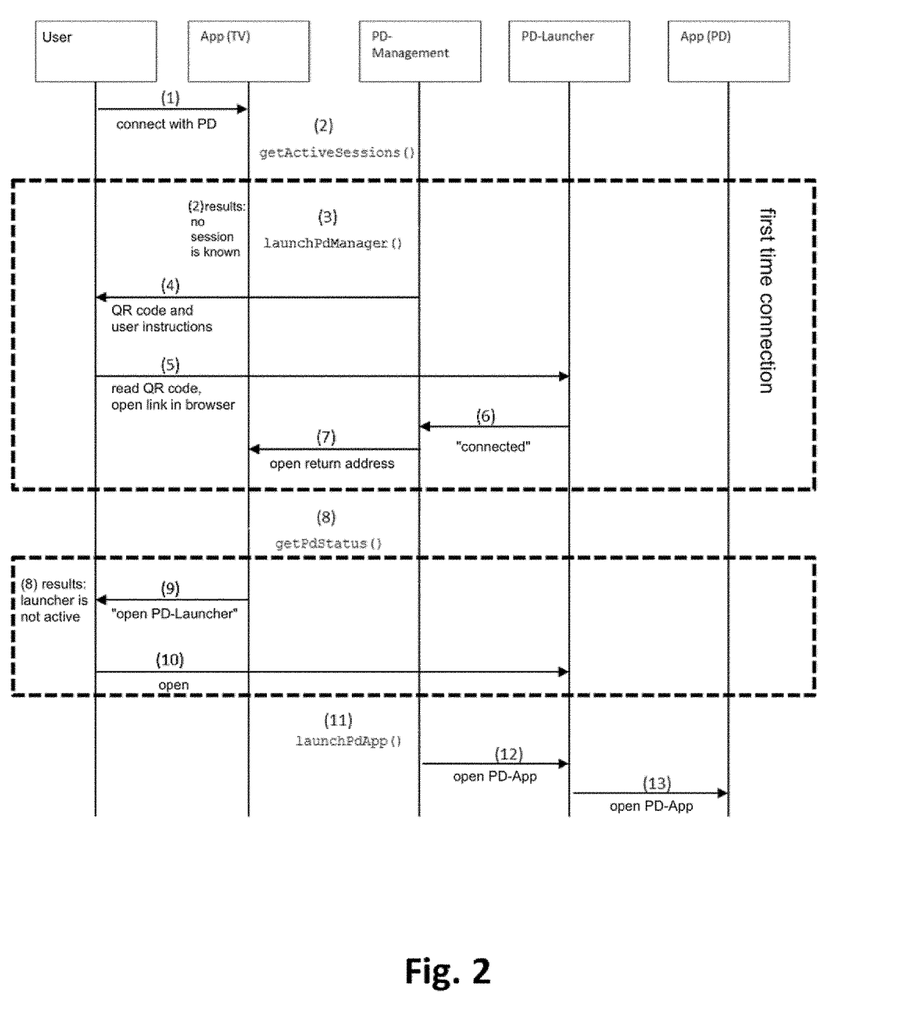
FIG. 2 schematically shows a process for creating a session.

In FIG. 2, the built up of an anonymous session is shown in principle. The built up will be described by means of the following steps. First, an initialization process is performed, wherein reference is made to the individual steps by means of numbers in brackets. The following numbers in the brackets, each thereof preceding a line, refer to the reference signs of individual steps in FIG. 2.

(1) In the application, the user invokes the menu item "connect with PD".

(2) The application queries for a known session on the TV device using PDManagement.getActiveSession( ). The following answers are possible:

No session is known. For the devices to be connected, the application must initialize the first time connection. Step (3) follows.

Session-ID of the known session. Step (8) follows.

(3) The application starts the PD-Manager using the invocation PdManagement.launchPdManager( ). Thereby, a number of transfer parameters are supplied (see specification), inter alia, a return address.

(4) The PD-Manager overlays the application as iFrame in a format filling manner. In the iFrame, a QR code an instructions for user guidance are displayed.

(5) The user, using his PD, reads the QR code and invokes the deposed link in his browser. The PD-Launcher is opened in the browser of the PD.

(6) The PD-Management is informed via the session server that the connection has been established.

(7) The PD-Manager invokes the return address. At the return address, the user could, for example, be informed about that the connection was successful.

(8) The application queries for the status of the known session. The following status reports are possible:

The PD-Launcher is not active. Then, step (9) follows.

The PD-Launcher is active. Then, step (12) follows.

(9) The application asks the user to open the launcher.

(10) User opens the launcher in the browser of his PD.

(11) The application invokes launchPdApp( ) in order to effect that an app is started on the PD.

(12) Launch command and to-be-invoked URL are forwarded to the PD-Launcher.

(13) PD-Launcher opens app.

Figure 3:
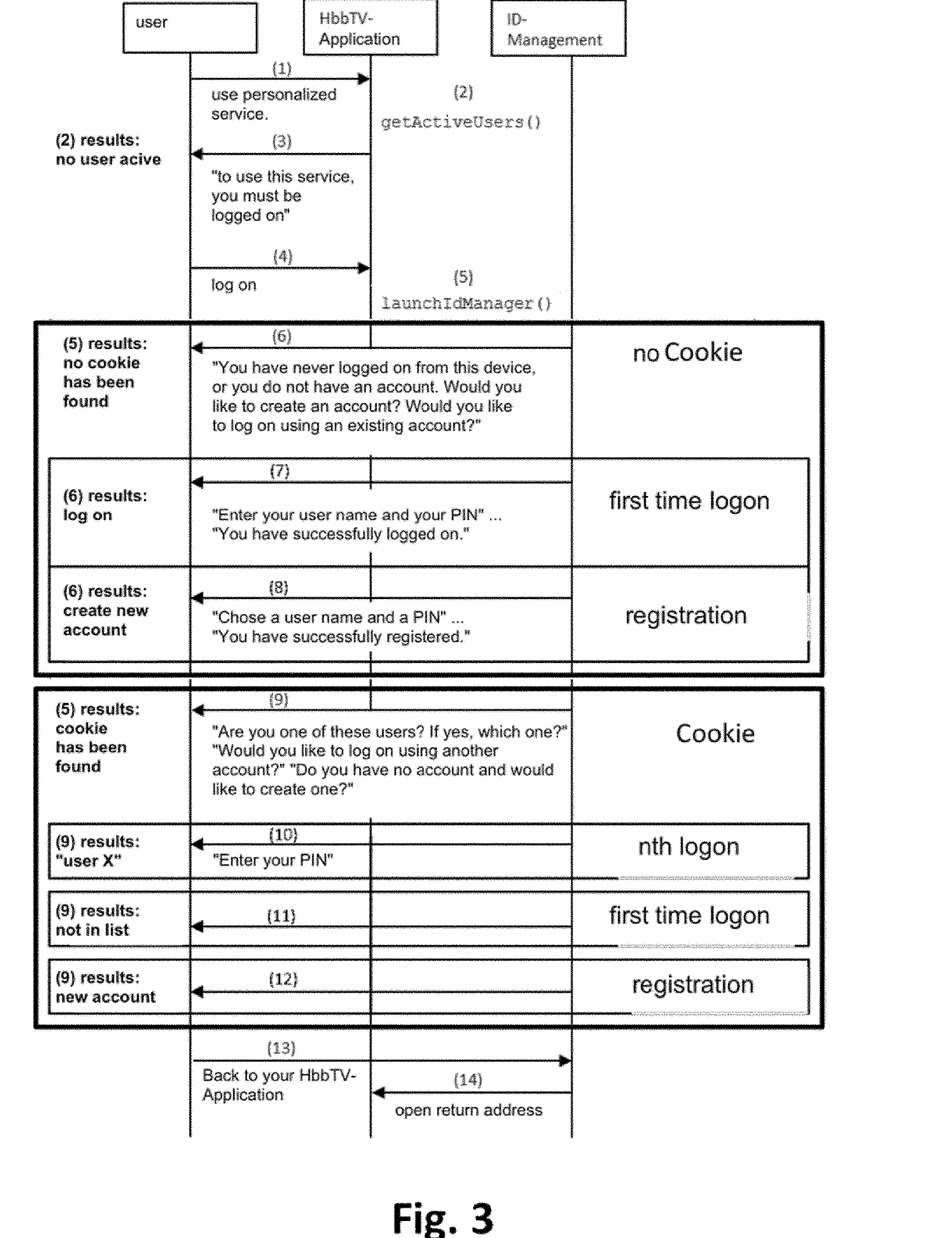
FIG. 3 schematically shows a process regarding a logon and registration.

In FIG. 3, the basic process of a logon and registration is shown, wherein reference is made to the individual steps by means of numbers in brackets. The following numbers in the brackets, each thereof preceding a line, refer to the reference signs of individual steps in FIG. 3.

(1) User selects a personalized service in the HbbTV-Application.

(2) The application queries the ID-Management whether user is logged onto the device.

(3) Because no user is logged on, the application indicates to the user that the desired services can only be invoked when the user is logged on.

(4) The user selects the menu item "logon" in the HbbTV-Application.

(5) The application the ID-Management opens with the corresponding command (see specification) a new web page (in an iFrame, which overlays the application page in a format filling manner or in a new window). This web page allows the interaction of the user with the ID-Management and/or the ID-Provision. The following steps up to and including step (13) run within this web page.

(6) The ID-Management determines that no cookie of the ID-Provision is deposited on the HbbTV-Device. This may have different reasons. For example, that the user has never logged onto this device or that he does not have an account yet. The user is informed thereon and asked whether he would like to log on using an existing account or register, that is, create a new account.

(7) The user has chosen the option of logging on using an existing account. Hence, he is asked to fill in his user name and his PIN in the form fields provided for this purpose. When the user has filled in correct data, he is informed about the successful logon.

(8) The user has decided to create a new account. He is asked to provide a user name and a PIN (confirmation of the PIN required). (optional feature: he is further asked to provide his email address. If the user should eventually have forgotten his account data, then he may let it be sent to his email address with a new password. For completing the registration process, the user must follow the link, which is contained in an email of the ID-Provision sent to him. This, he must perform on a PD (PC, tablet, smart phone).)

(9) The ID-Management determines that a cookie is deposed on the HbbTV-Device. The cookie contains a list of users that has already logged on from the used HbbTV-Device. This list is displayed to the user. The user is given the opportunity to select a user name from the list in order to then log on by entering the PIN. Moreover, the options to log on using another existing account and/or to create a new account are available for selection.

(10) The user has selected a name from the list and is asked to enter his PIN into the corresponding form field, on to which the focus is already placed. The user is informed about the successful logon.

(11) The user has not found his name in the list and has selected the option to log on using another account. Analogue to step (7).

(12) The user has selected the option to create a new account. Analogue to step (8).

(13) The user is logged on. He selects the option "back to the HbbTV-Application".

(14) The ID-Management invokes the return address.

For understanding the illustrations, designations, and used reference signs in the aforementioned figures, the following descriptions and definitions are to be consulted. Another advantageous embodiment of the present invention relates to a measure to let a first consumer device (21) (for example, an HbbTV compatible device) and a second consumer device (22) (for example, a tablet), which normally have no interface between them, communicate with each other nevertheless.

This is achieved in that a connection between both is built up via a network (31/32, 21, 22) (for example, the internet), namely a network, with which both consumer devices already have a connection/interface. Both the first consumer device (HbbTV-Device) and the second consumer device (tablet) have a connection to the network (or, for example, the internet).

For the advantageous embodiment, it is used a first server (31) within the network (31/32, 21, 22) and a second server (32) within the network (31/32, 21, 22). The first server (31) serves the purpose of establishing the connection between both devices and also of allowing later connections.

The second server (32) serves the purpose of allowing the connection for the transfer of data between both devices.

The first server assigns a combination of two corresponding ID codes (IDcode1, IDcode2) for the two devices, for which a connection is to be established.

For example, the first consumer device has established a connection to a service (10) (for example, the media centre of a broadcasting organisation, for example, of ARD) (HbbTV-Service 2). Now the user of the device would like to perform the navigation through the media centre by means of his tablet.

A component of the service is that a notification can be seen on the screen: "start second device/second screen?"

For this purpose, the user presses a button on his remote control of the device (21) so that the aforementioned question is answered with 'yes'.

According to an advantageous aspect of the invention a first establishment of the connection is performed.

When the connection between the first device (21) and the second device (22) is established for the first time, the PD-Management determines that a connection does not exist yet. This determination is made in that it is determined that no cookie with an ID code is stored in the device or that no connection on the server (31) is assigned to an ID code.

The service software in HbbTV-Application (11) starts the PD-Management software (41), which, for example, is already stored in the first device (21) or is loaded from the server so that the transmission of an ID code is queried by the PD-Server (31). The PD-Server (31) transmits this to the PD-Management (41) of the first device (21). ID-code1 is stored as a cookie in memory (4) and thereby identifies the first device (21).

The PD-Management (41) now starts the procedure in order to establish the first time connection.

The PD-Management (41) generates, for example, the request: "Start the second device (22) (for example, a tablet PC) and enter a URL in the browser".

Such a URLS could look like: "www.launcher.com/ID-code1".

The URL could, however, also be entered as QR code.

This URL starts the PD-Launcher (42). When no ID code has yet been assigned for the PD (22), such one is assigned by the PD-Session-Server (31) and stored as IDCode 2 on the PD (22) in the memory (6). Moreover, the PD-Launcher (42) transmits the IDCode 1, which he had obtained as parameter, to the PD-Session-Server (31). From this moment on, PD-Management (41) and PD-Launcher (42) poll the PD-Session-Server (31), the first device (21) using the IDCode1 and the second device (22) using the IDCode2. As soon as the PD-Session-Server (31) receives both ID codes, the PD-Session-Server (31) ensures that the IDCode2 is stored as cookie in the memory (6). Therewith, the device 12 is (also) identified in the connection. PD-Session-Server (31) transmits a report to the first device (21) and the second device (22) stating that the connection is established. Moreover, the PD-Launcher (42) asks the user to bookmark the URL "www.launcher.com" in the memory (6) so that this is easily started at a later time.

Therewith, the first time connection is established, as it is required for each device pair (21, 22) only once.

According to a further advantageous aspect of the present invention, HbbTV-Application (11) starts application (12) via PD-Management (41), PD-Session-Server (31), and PD-Launcher (42). Afterwards, HbbTV-application (11) mutually communicates with the PD-application (12) via PD-communicationc-Client (51), PD-Communication-Server (32) and PD-Comm-PD/PD-Communication-Client (52).

Now, for example, a media centre application in HbbTV-application (11) can start an application on a second electronic device (22) (for example, on a tablet PC): The media centre application should be started on the tablet.

According to another advantageous alternative, this command is supplied to the second device (22 via HbbTV-Application (11), PD-management (41), PD-Session-Server (31), PD-Launcher (42), and PD-Application/PD-Service (12).

The PD-Launcher (42) then starts in the browser of the second device (22) a new window with the received URL.

If there is the need for an information exchange between the two applications HbbTV-application (11) and PD-Application/PD-Service (12), then, in an advantageous manner, an information transmission is performed by means of polling PD-Communication-Client/PD-Comm-HbbTV/PD-Communication-Client (51) and PD-Comm-PD/PD-Communication-Client (52) of the PD-Communication-Server (32), using the corresponding ID-codes.

On the touch-sensitive screen of the second device (22), it is displayed, for example, a list of movies. According to advantageous alternatives of service/backend application (10), the list is transferred via a connection (55) to a PD-Comm-PD/PD-Communication-Client (52), from the first device (21) via the PD-Session-Server (31) or PD-Communication-Server (32) to the second device (22) or in dependence of service/backend-application (10)-HbbTV-Application (11)-PD-Application/PD-Service (12), from which, for example, one can select a movie by means of touching an icon on the screen for the movie. In addition, there is a further advantageous alternative, namely the loading of the list from service/backend-application (10).

If a movie is selected, it is generated a command signal "Movie "A" selected and send to me".

The aforementioned command is transferred to the web page of the media centre service. Thereupon, the service (10) transmits to the first device (21) the movie via the line. Here, the connection (55) is advantageously used for displaying the movie on the second device (22). Alternatively, the connection (66) is used for displaying the movie on the first device (21).

According to a further aspect of the present invention, when a corresponding service (12) is invoked on the tablet (22) by another HbbTV-Service (11) that resides on the web server (10) at a later time, the application of the new service is loaded into the first device (21) via the connection/line (66). The HbbTV-Service (11) queries the PD-Management (41) whether a tablet is already connected to the first device (21). The PD-management (41) forwards the query to PD-Comm-HbbTV/PD-Communication-Client (51) and then receives the corresponding answer. It is determined that a second device (22), for example, a tablet-PC, is connected to the first device (21).

According to an advantageous aspect of the present invention, when the second device (22), for example, a tablet PC, is not turned on yet, or the PD-Launcher is inactive, for example, because the browser is not opened yet or the launcher is not started yet, the user is notified that he can turn on the second device (22) and/or open the browser on the second device (22).

The PD-Management (41) and the PD-Launcher (42) now begin to poll the PD-server (31) by means of their ID-codes.

Subsequently, the service (10), as already described for the first time connection, transmits the URL of the new service to the second device (22), for example, to the tablet-PC via HbbTV-Service/Application (11)-PD-Management (41)-PD-Comm-HbbTV/PD-Communication-Client (51)-PD-Launcher (42). From this moment on, the modus operandi is as described above for the first time connection.

Further advantageous aspects of the invention are described in the following explanations, descriptions and figures.

The method according to the invention, is used for personalizing applications and/or application programs that are executed on a first electronic device and on a second electronic device, in particular, for HbbTV-Applications and 2nd screen applications. Here, the terms "application" and "application program" are used substantially synonymously.

The term 2nd screen (second screen) is to be understood in accordance with the definition given in this description. In particular, a 2nd screen is to be understood as a tablet PC, Smartphone, a device substantially consisting of a screen, in particular, a touch-sensitive screen.

The method according to the invention for personalization and 2nd screen applications in HbbTV-applications provides on the one hand cross-platform functions for User identification and -identification and thus an essential basis for the creation of profiles for personalized services and social TV offers. Moreover, it provides a complete toolkit for application developers for implementing the interaction between an application on the HbbTV-Device and an application on a 2nd screen, in the following referred to as PD for personal device (tablet, smart phone, PC). To these functions belong: coupling, also called "device discovery" or "mutually finding" of devices, in particular, by means of QR code or one of the communication possibilities listed in this description, connection build up, referred to as "device connection", in particular, the build up of a communication channel, called "session" in the following, which is referenced by means of a unique identification number, also called "ID" or "session", and device communication, in particular, the exchange of messages between the electronic devices via the communication channel. Moreover, by means of the method according to the invention a framework is created that accomplishes the launching of the HbbTV-Application and/or the starting of the applications on the PD.

In the following, it is described by means of a functional description of the components of the framework how the framework implements said functions. Furthermore, a description follows, the description relating to essential components of the framework for 2nd screen applications in HbbTV-Applications.

The discussion is limited to components that allow the operation of 2nd screen services. Thereto, the PD-Management, the PD-Communication-Client, the PD-Session-Server, the PD-Communication-Server, and the PD-Launcher belong. These are dividable according to components that operate on the TV device and/or the set top box (STB), components that operate in the backend, and components that operate on the PD. Moreover, the components are to be distinguished according to such ones that organize the connection built up of devices (device discovery and device connection), such as the PD-Management (on STB), the PD-Session-Server (on server), and the PD-Launcher (on PD), and such ones that handle the communication of the devices (device communication), such as the PD-Communication-Client (on TV and PD) and the PD-Communication-Server. The aforementioned system modules have the following tasks. The PD-Session-Server is, in particular, to be understood as the switch for a communication route Client(TV)-Server-Client(PD). The PD-Session-Server administrates what is referred to as Session-IDs, which uniquely identify a communication route. By assigning Session-IDs, it is ensured, in particular, that messages of a particular station arrive at the correct receiver. Moreover, the PD-Session-Server transmits the URL of a PD-Application and the command to start this in a browser of the PD, wherein the aforementioned transmission is performed from an HbbTV-Application to the PD. However, the actual communication between applications on TV and PD takes place via the PD-Communication-Server.

The PD-Management is to be understood as so-called "mouthpiece" of an HbbTV-Application to the PD-Session-Server. An HbbTV-Application can query the PD-Session-Server via corresponding interface queries. For example, the application can query whether an active connection to the PD-Session-Server exists for the HbbTV-Device. This query can be performed using "getActiveSessions( )" and whether a remote peer is responsive for the active session using "getPdStatus( )" so that it is queried whether the PD-Launcher is running Moreover the possibility exists to perform a first time connection process using a PD. This is required if and only if the query "getActiveSessions( )" completed "without any result". For this purpose, the PD-Management draws a user interface (for example, an HTML page) over the current HbbTV-Application. This can be performed in different ways. Either the PD-Manager draws a format-filling iFrame over the application, in which it displays the user interface (UI), or it opens a new window in the browser for this purpose. Then information for user guidance (such as "For connecting your television with a PD, please perform the following steps: . . . ") are placed in the UI and, for example, a QR code is drawn. The QR code contains a link to the PD-Launcher, to which the Session-ID generated by the PD-Session-Server is furthermore attached. The QR code is interpreted by a QR code reader on the PD. The link is opened in the browser of the PD. The PD-Launcher now runs on the PD, and the PD-Session-Server can assign both PD and TV device to a unique Session-ID.

When the PD-Launcher is running, an HbbTV-Application can issue the command to start a new application on the PD via the PD-Management by means of the invocation "launchPdApp( )".

The PD-Launcher functions, in particular, as a remote peer of the PD-Management on the PD side. When the PD-Launcher is active, it regularly queries (polls) the PD-Session-Server for new messages from PD-Manager. The PD-Launcher is, in particular, a web page that consists of a format filling iFrame. Into that, the PD-Application is loaded. The PD-Launcher is invoked at first time connection of HbbTV-Device and PD. The PD-Launcher can be bookmarked by the user in the browser of his PD. At repeated use, in order to connect his HbbTV-Device, the user must only open the bookmark, instead of performing the first time connection process using QR code or another connection type.

The PD-Communication-Server receives the messages of the applications from PD and/or HbbTV-Device and maintains them until they are queried by the respective remote peer. The PD-Communication-Client component is present on both the PD and the HbbTV-Device. It regularly queries the PD-Communication-Server for new messages (polling). Via it, the application can moreover send messages to the remote peer by means thereof.

A core feature of the framework is cross-application connection of the devices so that the connection of TV and PD is not limited to a service/an application. Once the connection is established by the user, then the session can be used by all applications using the framework.

Another core feature is the launching of applications on the PD, triggered from HbbTV-Application. The command to start an application on the PD, such as to start a new web page with additional programme information on the PD, can be given by the HbbTV-Application. In a sense, additional information can be pushed. A close connection of the contents on the 2nd screen with the ones of the linear content is performed.

Additionally, the messaging between applications on connected devices is a core feature. The applications on PD and HbbTV-Devices can exchange messages, in particular, strings. These can be parsed by the receiving applications and thus have different meanings for the interactions from the user's point of view. For example, the play back (play, pause, stop, etc) of video clips on the television screen can be controlled from the PD.

Moreover, the advantageous independence of coupling and communication constitutes a core feature. The session administration and the launching of applications are cross-application services and are performed via the PD-Session-Server. The communication between applications is application specific and takes place via the PD-Communication-Server. The division of the specific and generic services allows a better scaling of the server capacity. The generic services can be administrated by a central host; the specific services remain at the application provider.

In the following, based on user scenarios, further advantageous aspects of the invention are described for the electronic devices, in particular, for an HbbTV-PD-communication.

Some components, in particular, PD-Communication, PD-Server, PD-Communication-PD, PD-Launcher, PD-Comm-HbbTV, and PD-Management, have the task to allow an arbitrary service, which, in particular, is configured for the use on an HbbTV-Device (or an HybridTV device of another system), the start of a corresponding application on a "personal device" (PD) and to then communicate with it.

Advantageously, there are backend components for a service. The backend component are, in particular, PD-Service, HbbTV-Service, and web server service as PD version, HbbTV version, and webserver version.

The components, which are service neutral and allow the start of the PD version and the communication therewith for each service in the same manner, are PD-Management, PD-Server, PD-Launcher, and PD-Communication. They are hosted on a centrally installed server and the domain generally is different from the one of the individual services.

The typical steps are, in particular, the following steps for the use of the method.

The interfaces for the communication are dividable in an advantageous manner in service based and thus between services and in generic communication components.

A first time connection of electronic devices, in particular, between an HbbTV and a tablet PC, is characterized by the following steps.

A user starts the HbbTV-Service on the hybrid TV device. Then, the user selects an option within the HbbTV-Service that initiates the use of the PD. He optionally specifies for which user the connection is to be established. Then, the HbbTV-Service invokes the PD-Management that first checks via a cookie written by it whether a PD has already been connected for this HbbTV device or this user. If this is not the case, then a QR code is displayed on the TV screen. This contains, in particular, the URL for the PD-Launcher. The URL is also shown for optional use. Additionally, the query appears to read in the QR by means of his/her PD. The basic manner of assignment between the HbbTV and the PD is not limited to the use of a QR code, but is also implementable by means of one of the here described communication options. The assignment of the electronic devices is basically to be implemented by an information exchange between the electronic devices or by a third device as assignment instance. The read-in is performed, in particular, by an individual application, or the read-in is to be performed by means of a browser on the PD. Moreover, there is the option to manually enter the URL on the PD. The URL is, in particular, of the tiny URL type in order to avoid lengthy typing efforts and to improve user friendliness. Then the PD-Launcher starts on the PD and writes, in particular, a cookie with the UserID. When this has been performed, the PD-Launcher confirms this to the PD-Server that confirms this to the PD-Management that records the successful first time connection in a cookie. The PD-Launcher started on the PD asks and requests the user to bookmark this application so that it can always be restarted quickly. Following the successful establishment of a first time connection, in particular, a transfer of any application to be started as well as UserID by the HbbTV at the PD-Management is possible in the future. This then verifies, by means of the cookie, that a first time connection has been performed, carries out the PIN query, and hands the data over to the PD-Server. When the PD-Launcher that is connected to the PD-Server (by polling including UserID) is active, the PD-Server transmits the information regarding which URL is to be started to the PD-Launcher. Hereupon, the PD-Launcher starts the desired application. When the PD is not active, this is reported to the PD-Management by the PD-Server. This requests the user to start the PD-Launcher (and/or provides a corresponding error report to the HbbTV-Service, which in turn informs the viewer). The communication of the HbbTV-Service with the PD-Service is performed, in particular, as described in the following. The started PD-Service communicates, in particular, via the server PD-Communication, with the HbbTV-Service in a bidirectional manner. This communication allows the exchange of data of various types, in particular, of strings, which are separately and alternately generated and interpreted by the HbbTV-Service and the PD-Service. The connection between the electronic devices is mediated by the server, in particular, using Session-IDs or User-IDs. For the services, each of the components PD-Comm-HbbTV/PD-communication-HbbTV, and PD-Comm-PD/PD-Communication-PD provide interfaces that are easy to use. The components PD-Comm-HbbTV/PD-Communication-HbbTV and PD-Comm-PD/PD-Communication-PD perform the communication with the server PD-Communication and provide the required technical methods, in particular, polling and the like, for the actual data exchange.

In the following, further advantageous aspects of the invention are described by means of further examples for the interaction between application and framework.

According to an advantageous embodiment, the HbbTV-Application embeds the JS library for the PD-Management for the build up of anonymous sessions. Moreover, in an advantageous manner, the PD- and the TV-App will embed the JS library for the PD-Communication-Client for the exchange of messages. In the following, some advantageous aspects of the invention are described in detail by means of a process description, wherein the individual steps are not to be understood as fixed processes, but combinable with each other, expandable by other steps, or some steps can be left out if necessary.

First, the user invokes the menu item "connect with PD" in the application. Then the application queries, for example, using PDManagement.getActiveSessions( ), for a known session on the TV device. Here, for example, the following and similar responses are possible: "No session is known" or "Session-ID of the known session". In the case of the first answer and so that devices can be connected, a first time connection is initialized, in particular, by the application. The application starts the PD-Manager, for example, using the invocation PDManagement.launchPdManager( ). Thereby, a number of transfer parameter are included, in particular, a return address. The PD-Manager overlays the application as format-filling iFrame. In the iFrame, for example, a QR code and instructions for user guidance are displayed. Using his PD, the user reads the QR code and invokes, for example, the deposed link in his browser. The PD-Launcher is opened in the browser of the PD. Via the session server, the PD-Management is notified that the connection has been established. The PD-Manager invokes the return address. At the return address, the user could, for example, be informed about the fact that the connection has been successful. The further steps or in the case of the aforementioned second answer: "Session-ID of the known session" the following steps are identical. Subsequently, the application queries for the status of the known session. Here, the following status reports are possible: "The PD-Launcher is not active" or "The PD-Launcher is active". In the case of the first answer: "The PD-Launcher is not active" the application asks the user to open the launcher. Then the user opens the launcher in the browser of his PD. The application invokes, for example, launchPdApp( ) in order to effect that an app is started on the PD. The following steps or in the case of the aforementioned second status report: "The PD-Launcher is active" the following steps are identical. The launch command and to-be-invoked URL are forwarded to the PD-Launcher. The PD-Launcher opens app. Now the session is basically running Information can now be exchanged via the PD-Communication-Server. Thereby, the asynchronous invocation setMessageListener( ) queries the server for new messages. Using, for example, send Message( ) messages are sent to the remote peer.

In the following, further advantageous aspects of the present invention are described by means of a logon and registration.

First, for example, the selection of a personalized service is performed in the HbbTV-Application by the user. The application queries the ID-Management whether users are logged on to the device. Because no users are logged on, the application indicates to the user that the desired services can only be invoked when the user is logged on. The user selects, for example, the menu item "logon" in the HbbTV-Application. The application invokes the ID-Management with the corresponding command. The ID-Management opens a new web page (in an iFrame that overlays the application page in a format filling manner or in a new window). This web page allows the interaction of the user with the ID-Management and/or the ID-Provision. The following steps up to and including step (back to HbbTV application) are performed within this web page. The ID-Management determines that, for example, no cookie of the ID-Provision is deposed on the HbbTV-Device. This can be for different reasons. For example, that the user has never logged onto this device before or that he has no account. The user is informed thereabout and asked whether he would like to logon using an existing account, or to register, that is, create a new account. The user has selected the option to logon using an existing account. Hence, he is asked to enter his user name and his PIN in form fields provided for this purpose. If the user has entered the correct data, he is informed about the successful logon. The user has decided to create a new account. He is asked to provide a user name and a PIN (confirmation of the PIN required). (optional feature: he is further asked to provide his email address. If the user should eventually have forgotten his account data, then he may let it be sent to his email address with a new password. For completing the registry process, the user follows a link, which is contained in an email of the ID-Provision sent to him. This, however, he must perform on a PD (PC, tablet, smart phone).)The ID-Management determines that a cookie is deposed on the HbbTV-Device. The cookie contains a list of users that has already logged on from the used HbbTV-Device. This list is displayed to the user. The user is given the opportunity to select a user name from the list in order to then log on by entering the PIN. Moreover, the options, to log on using another existing account and/or to create a new account, are available for selection. The user has selected a name from the list and is asked to enter his PIN into the corresponding form field, on to which the focus is already placed. The user is informed about the successful logon. The user has not found his name in the list and has selected the option to log on using another account. Then the aforementioned step is performed, as if the user had chosen the option to log him on using an existing account. If the user selects the option to create a new account for him, the aforementioned step is performed as if he had decided to create a new account. If the user is logged on, he selects the option "back to the HbbTV-Application". The ID-Management invokes the return address.

Further advantageous aspects of the invention are to be retrieved from the following description.

Here, it is again noted that the following abbreviations are used: GUI for graphical user interface; PD for personal device/smart phone or tablet PC, which, however, are also separately used as "second screen" without broadcast receiver; and PIN for personal identification number.

In the following, according to the advantageous invention, the framework for implementation of 2nd screen applications and personalization services are described for HbbTV-Applications. Basic functions of the framework are described and the interfaces are described that can use the framework via the applications.

The essential components of the framework provide basic functions for implementing personalized services and 2nd screen applications in an advantageous manner. These comprise, in particular, a user administration and device administration.

An ID-Provision plays the role of the OpenID-Provider. The following are tasks thereof: storing cross-application user data, such as User-ID, nickname, PIN, and User identification.

An ID-Management allows the communication of the user from the devices TV and PD with the OpenID-Provider by means of a GUI and organizes the registration of users with the OpenID-Provider (performed first, in particular, from the TV) and this includes, for example, that a user either provides an ID or is assigned an ID, the user provides a user name (nickname) or the user provides a PIN. The application registers users with the OpenID-Provider, this includes a logon using User-ID/nickname and PIN or the user is logged onto the TV and couples it with his PD, the PD-Launcher forwards the User-ID to the ID-Management. The user is logged on via the ID-Management. In the logon dialogue, the field user name is prefilled and the focus lies on the PIN input. Moreover, the explicit logoff by the user and/or the logoff via timeout caused by absence of user action belong to the category of the application of registered users at the OpenID provider. The ID-Management manages the user related cookie handling. For this purpose, it deposes User-IDs of before logged-on users. The later logon is simplified because before logged-on users can be enlisted in a list and the nicknames/User-IDs do not have to be entered again and it stores the activity status of a user.

The ID-Management disconnects the connection between PD and TV when the user is logged off. A PD-Management organizes the connection built up and controls the first time connection process with personal device (for example, display of the QR code, etc.) or, when a user would like to establish a connection to a known device, the PD-Manager determines the launcher status. If a launcher is not active, it asks the user to start the launcher on the personal device. The ID-Management initializes the start of new applications on the 2nd device by forwarding corresponding commands to the PD-Launcher.

A PD-Session-Server maintains the connection between two devices, which are identified via a Session-ID or User-ID, and assigns Session-IDs. Via a PD-Communication-Server or a PD-Communication component, the application exchange messages on PD and HbbTV-Devices.

A PD-Launcher queries the PD-Server whether new applications should be started on the personal device and/or provides the start command for an application to the personal device.

Starting a web application is performed in different ways: a new tab is opened in the browser and the application is here started, the surface of the launcher is a (format filling) iFrame, in which the application is started, or a new browser window is opened, in which the application is started.

The PD-Launcher stores connection data, in particular status and/or user-ID/session-ID of the personal device in cookie and forwards the user-ID and the ID-Management to the PD.

The ID-Management and PD-Management are, in particular, HbbTV web pages, which are loaded from a terminal. Points of integration to the framework are, in particular, JavaScript method invocations. For this purpose, in particular, corresponding JavaScript library are embedded in the HbbTV-Application, for example, by means of: <script type="text/javascript"src="http ://www.pdserver.de/resource/name.js"></script>.

In another advantageous embodiment, so-called identifiers are used. These include, in particular, User-ID, Session-ID, and Service-ID. The User-ID serves, in particular, as user identification for personalized services and furthermore as reference for the connection of TV and PD of a specific user. The Session-ID serves, in particular, as reference for a specific anonymous connection of TV and PD.

The Service-ID serves, in particular, as identifier for identification of an application. Moreover, the service ID is used, in particular, to assign messages that are exchanged via the PD-Communication-Server to applications. This way, it can, for example, be prevented that a message from the PD to the TV device reaches the wrong application when the user at the TV device has switched to another service beforehand. The formats of User-ID, Session-ID, and Service-ID are, in particular, defined by the used ID-Provider, for example, OpenID. The session-ID has, in particular, the form SESID:<id> and is generated by the framework. The service ID has, in particular, the form SVCID_<domain>#<id> and is chosen by the application. The domain is, in particular, an internet domain of the service provider. Broadcast HbbTV-Applications use, in particular, their Application-ID, such as: SVCID:ard.de#13.3.

According to an advantageous embodiment of the present invention, in particular, points of entry of the HbbTV-Application lead to the framework, in particular, via the ID-Management, the PD-Management, and the PD-Communication-Server.

In the following, the corresponding invocations are specified.

PDStatus is an object and, in particular, responsible for status information about active and inactive connections to PDs. In particular, statusCode, launchState, and errorCode are to be listed as "property". The aforementioned properties are, in particular, of the number type. The StatusCode specifies the connection status of the PD stored on the PD-Server. The StatusCode takes, in particular, the following values for user-bound sessions: user has never connected a PD with the PD-Manager, PD of the user is connected and the PD-Launcher is active, and user had his PD already connected; however, connection is not active, that is, the PD-Launcher does not poll. The StatusCode takes the following values for anonymous sessions: session is unknown to the server, session is known (the PD-Launcher is active on the PD), and session is known (PD-Launcher is not active on the PD). If an error has occurred, the value is 0; the error details are, in particular, queried via the errorCode.

PDComStatus is an object and responsible, in particular, for status information about the connection to the PD-Communication-Server. Property is ComStatus and of the number type. The PDComStatus provides, in particular, information about the status of the Client-Server-Client communication channel. With "0" as connection valid, with "1" as connection invalid, and with "3" as connection invalid, remote peer not reachable, for example, because HbbTV-Device is turned off.

UserInfo is an object, in particular, for information towards a user. Properties are, in particular, "userID" and "nickname" of the string type. The userID functions, in particular, as identification identifier of a user and nickname as user name of a user.

MessageEvent is an object, in particular, for events of the PD-Communication-Server, which contain the message of the remote peer or an actualization of the status object. Properties are "communicationID", "message", and "status" of the string type and/or PDComStatus. The Communcationld operates, in particular, as identification identifier of the user or the session, for which the EventHandler has been added. The message is, in particular, the message of the remote peer. The status contains, in particular, information about the current status of the connection to the peer remote.

The functions and properties of the ID-Management are invoked via the Singleton-Object IdManagement, such as using IdManagement.getActiveUsers( ).

A "getActiveUsers( )" is of the type "userInfo[]" and provides, in particular, a list of the logged-on users. Different release versions of the framework will allow different numbers of active users. This includes "in" and "out" of the type "undefined" and "USerInfo[]". The Userinfo[] is, in particular, an array of users with ID and nickname. In a release version, in particular, only one active user is returned.

A "launchIdManager(returnUrl, backgroundUrl)" starts, in particular, the ID-Manager. This draws the GUI of the ID-Management, in particular, in a format-filling HTML page. The GUI overlays a background image, the URL of which can be handed over. For the background image to be format-filling, it should, in particular, be of 1280×720 pixels in size. Via the GUI, in particular, the users perform all inputs required by the user administration. On a device, in particular, a user in logged on. As parameters for "in", "returnUrl" and "backgroundUrl" of the string type and, for "out", of the type undefined are to be listed. The ReturnUrl is the return address. The URL contains, as additional parameter, in particular, all status information that the invoking application requires for continuance of the user dialogue. The BackgroundUrl is the URL to the resource of the background image. Here, in particular, the image formats allowable for the HbbTV are permitted.

A "keepAlive( )" resets, in particular, the timeout of the ID-Management, after all logged on users are logged off. The keepAlive( ) should be invoked with each user activity. The timeout is, in particular, at 15 minutes. For "in" and "out" undefined is to be listed as type.

A "setUserActivityStateListener(userActivityHandler)" registers, in particular, an event handler that reacts to changes of the activity status of a user. As parameter for "in", userActivityHandler is of the type function and, for out, the type is undefined. The UserActivityHandler has, in particular, a call-back function, which is invoked when the activity status is changed, for example, at automatic logout. The function is, in particular, invoked without parameters.

The functions and properties of the PD-Management are invoked via the Singleton-Object PdManagement, for example by "PdManagement.getPdStatus( );". The "getPdStatus(userId):PDStatus" provides, in particular, the status of the connection of a PD for a specific user. The status is maintained on the PD-Server and queried there. For "in" as parameter "userId" of the string type and for "out" of the "PDstatus" type are to be listed. The UserId is, in particular, the identification identifier of the user. The PDStatus returns the connection status for the provided user.

A "getPdStatusAnonymous(sessionId):PDStatus" provides, in particular, the status of an anonymous connection (session) between the PD-Manager and a PD. The status is maintained at the PD-Server and queried there. For "in" as parameter "sessionId" of the string type and for "out" of the type "PDStatus". The sessionId is, in particular, an identification identifier of an anonymous connection. The PDStatus returns, in particular, the connection status for the specified user.

A "launchPdManager(userID, nickname, returnUrl, backgroundUrl):Boolean" starts, in particular, the PD-Manager. This draws the GUI of the device administration in a format-filling HTML page. The GUI overlays a background image, the URL of which can be handed over. For the background image to be format-filling, it should be of 1280×720 pixels in size. Via the GUI, the user can perform the first time or new connection of his PDs. The parameter for "in" are "userId", "nickname", "returnUrl" and "backgroundUrl". The types are string and boolean. The UserID is, in particular, identification identifier of the user. The nickname is the username of the user for log in. The ReturnID is the return address. The URL will contain, as additional parameter, all status information that the invoking application requires for the continuance of the user dialogue. The background is the URL to the resource of the background image. The image formats allowable for the HbbTV are allowed in particular. For "out" as boolean is an indicator whether the PDManager can be loaded successfully. The result for "true" has the meaning that the invoking page should not execute any further actions and for "false" the meaning that the PD-Manager cannot be executed so that the invoking page remains visible for the user.

A "launchPdManagerAnonymous(returnUrl, backgroundUrl):Boolean" starts, in particular, the PD-Manager-The PD-Manager draws the GUI of the device administration in a format-filling HTML page. The GUI overlays a background image, the URL of which can be handed over. For the background image to be format-filling, it should be at least 1280×780 pixels in size. Via the GUI, the user can perform an anonymous first or new connection of his PD. Subsequent to successful connection, the Session-ID is returned. For "in", the parameters "returnUrl" and "backgroundUrl" are of the string type and, for "out", of the boolean type. The ReturnUrl is the return address. The URL contains, as additional parameter, all status information that the invoking application requires, in particular, for the continuance of the user dialogue. The session-ID is attached to the end of the URL, in particular, as further parameter, for example by means of "<returnUrl>(?|&)sessionId=<SessionId>". The BackgroundUrl is a URL to the resource of the background image. The image formats allowable for HbbTV are allowed in particular. As "out" of the boolean type serves as the indicator whether the PD-Manager can be loaded successfully. With "true" the result means that the invoking page should not execute any further actions and with "false" that the PD-Manager cannot be executed, wherein the invoking page remains visible for the user.

A "getActiveSessions( ):String[]" determines a list of sessions active of a HbbTV-Device from a cookie there deposed. As type for "in" "undefined" and for "out" "String []" as array of identification identifiers of anonymous connections of the HbbTV-Device are to be listed.

A "launchPdApp(useriD, pdAppUrl):PDStatus" a (personalized) application starts in the browser of the PD. To this address of the application, the Communication-ID is attached. This ID corresponds to the User-ID and must be specified when using the PD-Communication-Server (in particular, according to sendMEssage( )). The final Application-URL is formed as follows: "<pdAppUrl> (?|communicationId=<userId>". As parameter for "in" are "userId" and "pdAppUrl" of the string type and for "out" of the PDStatus type. The UserID is identification identifier of the user, and PDAppUrl is URL of the application to be started. The PDStatus returns the connection status for the specified user.

A "launchPdAppAnonymous(sessionId, pdAppUrl):PDStatus" starts an application in the browser of the PD, which is connected via a anonymous session. To the address of the application, the Communication-ID is attached. This ID corresponds to the Session-ID and must be specified when using the PD Communication-Server, see "sendMessage( )". The final Application-URL is formed as follows: "<pdAppUrl>(?|&)communicationId=<sessionId>". For "in", "sessionId" and "pdAppUrl" are the parameters, wherein these are of the string type and for "out" of the PDStatus type. The SessionId is the identification identifier of a session and PdAppUrl of the URL of the application to be started. The PDStatus returns the connection status for the specified user.

The interfaces are available on both sides of the second screen application. The functions and properties of the PD-Communication are invokes via the Singleton-Object PdCommunication, for example, by "PdCommunication.sendMessage( );".

A "sendMessage(message, communicationId, serviceId): PDComStatus" transmits a message to a specific application that is active on devices of a specific session. The parameter "in" are "message", "communicationId", and "pdAppUrl" of the string type for "out" of the "PComStatus" type. The message is the message content, the CommunicationId the identification identifier of a session or of a user that is used for the communication and the PdAppUrl of the URL of the application to be started. The PDComStatus for "out" shows the status of the connection to PD-Communication-Server.

A "setMessageListener(messageHandler, CommuncationId, serviceId,[pollingPeriod]):PDCsomStatus" registers an event handler for the reception of messages from or to the second screen. For "in" the parameters are "messageHandler", "communicationId", "serviceId" and "pollingPeriod", wherein "messageHandler" is of the function type and the remaining parameters are of the string type. The "messageHandler" has a callback function that is invoked when a message is transmitted from the 2nd screen or the TV app. Here, a message event is handed over to the function. The "communicationId" is an identification identifier of a session or a user that is used for the communication. The "serviceId" is the identification identifier of the service/the application.

The "pollingPeriod" is a time period in milliseconds, at which the PD-Communication-Server is queried for ne messages. Thereby, the value "0" means that an open connection should be established (long polling). The PDComSTatus shows the status of the connection of the PD-Communication-Server.

A "removeMessageListener" (messageHandler, communicationId):PDComStatus" removes the EventHandler for the specified session. For "in", "messageHandler" of the function type and "communicationId" of the string type are the parameter, wherein "PDComStatus" represents the type for "out". The "messagHandler" is a callback function that is invoked when a message is sent from the 2nd screen or the TV-App. The "communicationId" is the identification identifier of a session or a user that is used for the communication. The PDComStatus indicates the status of the connection to PD-Communication-Server.

The invention claimed is:

1. A method of accessing an internet-based service through an HbbTV television set, the method comprising:
    an HbbTV application displaying information comprising a first URL on a display of the HbbTV television set for establishing a connection between the HbbTV television set and a personal device of the user, the personal device including a camera;
    reading the information on the display of the HbbTV television set with the camera by the personal device and launching a first application on the personal device by opening the first URL;
    coupling, via a server, the HbbTV television set to the personal device;
    transmitting, via the server, a command from a second application on the HbbTV television set to the personal device to open a second URL; and
    opening, by the personal device and in response to the command, the second URL to access the internet-based service.

2. The method according to claim 1, wherein the information comprises an identification of the HbbTV television set.

3. The method according to claim 1, wherein the information comprises a QR code.

4. The method according to claim 1, wherein the first application couples the personal device to the HbbTV television set by establishing a communication channel between the personal device and the HbbTV television set through the server.

* * * * *